United States Patent
Brown et al.

(10) Patent No.: US 6,934,254 B2
(45) Date of Patent: Aug. 23, 2005

(54) METHOD AND APPARATUS FOR DYNAMICALLY ALLOCATING RESOURCES IN A COMMUNICATION SYSTEM

(75) Inventors: William Leslie Brown, Mississauga (CA); Jian Yang, Mansfield, MA (US); Sepehr Mehrabanzad, Southborough, MA (US); Dae-Young Kim, Lexington, MA (US)

(73) Assignee: Motorola, Inc., Schaumburg, IL (US)

( * ) Notice: Subject to any disclaimer, the term of this patent is extended or adjusted under 35 U.S.C. 154(b) by 925 days.

(21) Appl. No.: 09/764,959

(22) Filed: Jan. 18, 2001

(65) Prior Publication Data

US 2002/0093913 A1 Jul. 18, 2002

(51) Int. Cl.[7] .............................................. H04L 12/26
(52) U.S. Cl. .................................... 370/232; 370/437
(58) Field of Search ................................ 370/232, 431, 370/437; 712/22; 709/213

(56) References Cited

U.S. PATENT DOCUMENTS 5,390,336 A * 2/1995 Hillis ........................... 712/22
5,519,689 A * 5/1996 Kim ........................... 370/232
6,104,721 A * 8/2000 Hsu ........................... 370/431
6,185,607 B1 * 2/2001 Lo et al. ..................... 709/213

* cited by examiner

Primary Examiner—Salvatore Cangialosi
(74) Attorney, Agent, or Firm—James A. Lamb

(57) ABSTRACT

A method and apparatus is provided that dynamically allocates processor resources to data transfer-related operations, minimizing the processor resources used for data transfer-related operations and maximizing the processor resources available for other applications. The apparatus comprises a communication device (104), comprising a processing unit (204) and a complexity controller (206), which communication device (104) is capable of executing multiple data transfer-related operations and is highly configurable. The complexity controller (206) monitors a condition of a communication channel (102) and determines the best configuration of communication device (104) in regard to processor resource utilization to meet a given Quality of Service requirement for the condition of channel (102) and to maximize the processor resources available for other applications, such as data terminal equipment user applications (108) or signal processing by other communication devices using the same host processor.

16 Claims, 2 Drawing Sheets

METHOD AND APPARATUS FOR DYNAMICALLY ALLOCATING RESOURCES IN A COMMUNICATION SYSTEM

FIELD OF THE INVENTION

This invention is generally related to the field of multimedia communication and, in particular, to the dynamic allocation of resources.

BACKGROUND OF THE INVENTION

Presently, multimedia communication devices (MCD's), such as analog and digital modems and more generally communication devices that support voice and video capabilities, are used to transfer or transport data between data terminal equipment (DTE) such as personal computers, workstations, mainframe computers, and other terminals, over various communications channels such as telephone lines, T1 lines, or ISDN lines, which also may be part of a computer network. Typically, the data is transmitted, received, or otherwise transferred in the form of a digitally encoded communication signal, which may include, for example, digitally encoded data transmitted on a carrier signal, having a predetermined or otherwise specified carrier frequency, that modulates a predetermined constellation of signal points (such as quadrature amplitude modulation (QAM)), at a predetermined signaling or symbol rate (often referred to as a baud rate). For a given channel, the data signaling rate will vary as a function of both the symbol rate and the number of signal points or size of the constellation.

At the sending or transmitting MCD, the set of constellation signal points corresponding to the digital code or value to be sent is modulated by a carrier signal and transported over the communication channel. The channel, however, typically introduces a variety of impairments that affect the transmitted signal, such as amplitude and phase distortion, envelope delay distortion, non-linear distortion, and additive noise and interferences.

MCD's typically execute multiple data transfer-related operations, which includes signal processing operations such as echo cancellation, signal equalization, and forward error correction coding, as well as data processing operations, such as data compression, voice compression, and linklayer error correction. These operations are intended to compensate for effects of noise and interference that might be introduced by the communication channel, and to enhance user data throughput. The multiple data transfer-related operations are typically executed by some type of host-based processor (such as a personal computer) or embedded processor (such as a dedicated digital signal processor microprocessor, or micro-controller).

An MCD typically allocates a static amount of processor resources, which includes MIPS (millions of instructions per second) and memory, sufficient to provide for the performance of a full complement of data transfer-related operations. That is, in order to process data for transmission over a communication channel, the MCD will allocate sufficient processor resources to execute, and will execute, a comprehensive instruction set for data transfer-related operations, that includes multiple data processing operations such as data compression or voice compression, as well as signal processing operations designed to compensate for worst case channel conditions.

With the advent of fast processors capable of handling the entire MCD function with a fraction of its processing power, the MCD may share the processor with other tasks. For example, the functions of multiple MCD's might be implemented on a single processor, or the functions of an MCD might be implemented on the central processing unit (CPU) of a personal computer running a plurality of other applications. In situations such as these, the static processor resource allocation strategy may not be optimal. For example, while an MCD typically allocates a sufficient amount of resources to process signals in worst case channel conditions, the vast majority of channel conditions are relatively benign and do not require such complex signal processing. By allocating processor resources under the assumption of worst case conditions, processor resources are allocated to tasks that are unnecessary in benign channel conditions. These latter processor resources can be applied to other tasks in such instances.

Therefore, a need exists for a method and apparatus for adapting the utilization of the processor resources. A still further need exists for a method and apparatus for dynamically allocating the processor resources based upon the channel conditions, applications, and quality of service requirements.

DESCRIPTION OF A PREFERRED EMBODIMENT

Figure 1:
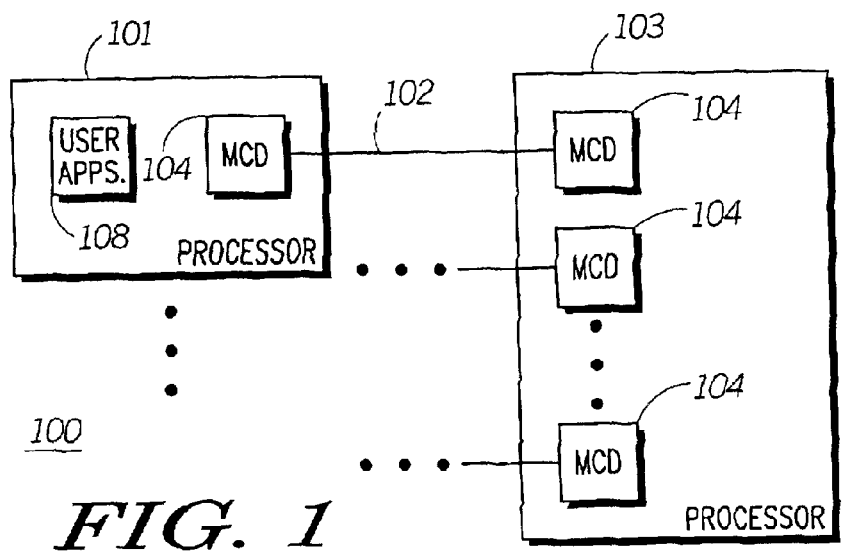
FIG. 1 is a block diagram of a communication system in accordance with one embodiment of the present invention.

To address the need for a method and apparatus for determining channel conditions and adapting the processor resources to the determined channel conditions, a method and apparatus is provided that dynamically allocates processor resources to data transfer-related operations, minimizing the processor resources used for data transfer-related operations and maximizing the processor resources available for other applications. The apparatus includes a processing unit and a complexity controller, which processing unit is capable of executing multiple data transfer-related operations and is highly configurable. The complexity controller monitors a condition of a communication channel and determines the best configuration of the processing unit in regard to processor resource utilization to meet a given Quality of Service (QoS) requirement for the channel condition and to maximize the processor resources available for other applications, such as data terminal equipment user applications or signal processing by other communication devices using the same host processor.

Generally, the present invention encompasses an apparatus for the dynamic allocation of processor resources of a communication device, wherein the communication device is implemented on a processor and includes multiple data transfer-related operations, which includes data signal processing algorithms and processor resources. The apparatus includes a complexity controller, wherein the complexity controller controls the allocation of the amount of processor resources by determining to execute at least one data transfer-related operation of the multiple data transfer-related operations. The apparatus further includes a processing unit coupled to the complexity controller, wherein the processing unit executes the at least one data transfer-related operation, based on the determination to execute at least one data transfer-related operation, thereby utilizing a dynamically allocated amount of processing resources.

Another embodiment of the present invention encompasses a method for dynamically allocating multiple processor resources by a communication device, wherein the communication device comprises multiple data transfer-related operations. The method includes the steps of determining to execute at least one data transfer-related operation of the multiple data transfer-related operations and allocating the processor resources based on the determination to execute the at least one data transfer-related operation.

Finally, another embodiment of the present invention encompasses a method for dynamically allocating processor resources by a communication device, wherein the communication device comprises a plurality of data transfer-related operations. The method includes the steps of determining a condition of a communication channel and allocating the amount of processor resources based on the determined condition of the communication channel.

It should be noted that in accordance with a preferred embodiment of the present invention, the method and apparatus for the dynamic allocation of the amount of processor resources by a communication device may preferably be determined based upon the execution of the range of at least one to all data transfer-related operations.

Turning now to the drawings, wherein like numerals designate like components, FIG. 1 illustrates a communication network 100 in accordance with an embodiment of the present invention. Communication network 100 comprises multiple network terminals 101 and 103 (two shown), coupled to each other via a communication channel 102, such as telephone lines, T1 or ISDN lines, optical fibers, coaxial cables, wireless, or a hybrid combination of the above. Each network terminal 101 and 103 preferably comprises a data communication device (DCD) 104, preferably a variable complexity multimedia communication device (MCD), implemented on a processor. MCD 104 is used to transfer data among each of the multiple network terminals 101, 103 over communication channel 102. MCD 104 typically operates in a full-duplex mode, such that MCD 104 may transmit data and receive data at the same time.

In the illustrated embodiment, the processor comprises a central processing unit (CPU) of a data terminal equipment (DTE), such as a hand-held communication device, personal computer, workstation, mainframe computer; however, in the alternative, the processor might comprise a digital signal processor (DSP) of a multi-channel modem, or any other device providing processor resources. MCD 104 shares the processor resources with other applications, such as applications of other MCD's also implemented on the same processor or user DTE applications 108, and dynamically allocates processor resources as described below.

Figure 2:
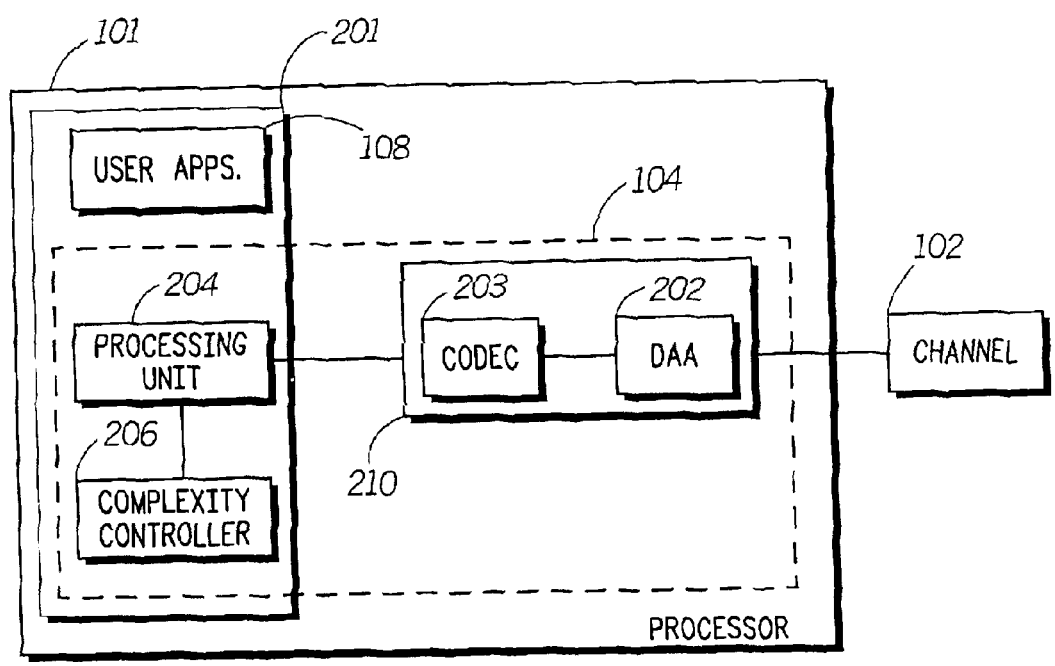
FIG. 2 is a block diagram of a communication device in accordance with another embodiment of the present invention.

FIG. 2 is an illustration of network terminal 101 in accordance with an embodiment of the present invention. In the illustrated embodiment, a software embodiment, MCD 104 is embodied as a set of program instructions. The set of program instructions may be stored on any computer readable medium such as a floppy disk or CD ROM. When loaded into a host processor 201, such as a Pentium class microprocessor produced by Intel Corporation, MCD 104 utilizes the resources of host processor 201. In the illustrated embodiment, MCD 104 further includes a processing unit 204 coupled to a complexity controller 206, and an interface apparatus 210 coupled to host processor 201. Preferably, processing unit 204 and complexity controller 206 are both implemented in host processor 201. Complexity controller 206 monitors information regarding a channel condition and performance margin of MCD 104 and determines the processor resource allocation for processing unit 204. Processing unit 204 performs the data transfer-related operations of MCD 104, such as transceiver training, equalization, echo cancellation, error correction encoding/decoding, and (de)scrambling for a corresponding channel, based on the configuration determined by complexity controller 206.

Interface apparatus 210 includes a data access arrangement (DAA) 202 that receives and transmits analog signals on channel 102, and an analog-to-digital and digital-to-analog converter (A/D and D/A converter) (or equivalently a coder-decoder known as a "codec") 203, such as an SGS Thompson ST 7544 or ST 7545, that is coupled to DAA 202. Codec 203 converts an analog signal received from communication channel 102 to sampled, digital form, and converts sampled, digital information to analog form for transmission over communication channel 102. DAA's 202 are well-known in the art and may be made of a variety of discrete components, including analog multiplexers, resistors, capacitors, and operational amplifiers, or may be embodied in whole or part as an integrated circuit, and performs such functions as 4-wire to 2-wire conversion, impedance matching and power level adjustment. Interface apparatus 210 further includes other structures such as a memory and an interface, which interface couples interface apparatus 210 to the processor 201, as described in detail in U.S. Pat. No. 5,802,153, issued to Sridhar et al., and assigned to the assignee of the present invention and hereby incorporated by reference herein.

Figure 3:
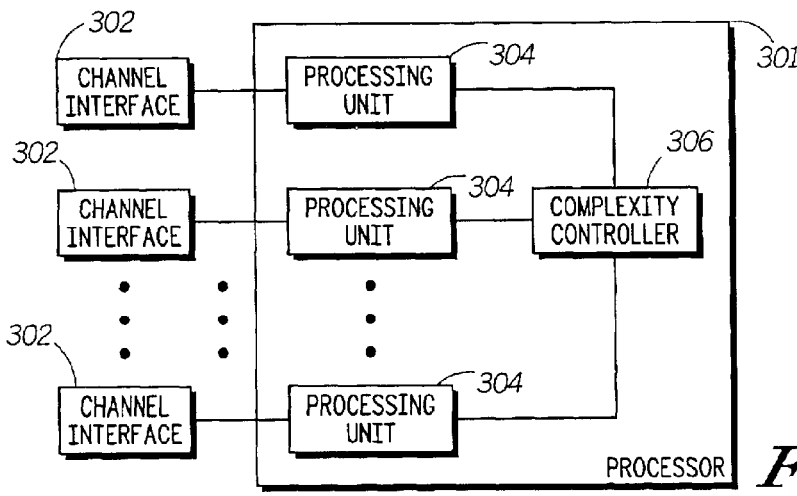
FIG. 3 is a block diagram of a communication device in accordance with an alternate embodiment of the present invention.

FIG. 3 is an illustration of an MCD 300 in accordance with an alternative embodiment of the present invention. MCD 300 includes a multi-channel modem implemented in a single processor 301, preferably a DSP. MCD 300 supports multiple communication channels and comprises multiple channel interfaces 302, each channel interface 302 being capable of being coupled to a channel supported by MCD 300. The channels can each comprise an analog communication channel, a digital communication channel, or a hybrid communication channel. MCD 300 further comprises multiple processing units 304, wherein each processing unit 304 is coupled to a channel interface 302 and performs MCD 300 data transfer-related operations such as transceiver training, equalization, echo cancellation, error correction encoding/decoding, and (de)scrambling for a corresponding channel. MCD 300 further comprises a complexity controller 306, coupled to each of the multiple processing units 304, that determines the processor resource allocation of each processing unit 304 based on the condition of the processing unit's corresponding channel. Preferably, each processing unit 304 and complexity controller 306 is implemented in processor 301.

While reference repeatedly is made below to a host processor 201, those who are of ordinary skill in the art will realize that the functions performed by host processor 201 in the preferred embodiment may be performed by any signal processing device, such as DSP 301 in MCD 300, that provides processor resources, without departing from the scope of the present invention.

When an analog signal is transmitted by MCD 104 via communication channel 102, communication channel 102 typically introduces a variety of impairments or noise which affect the transmitted signal, such as amplitude and phase distortion, envelope delay distortion, non-linear distortion and additive noise and interferences. As a result, processing unit 204 typically executes multiple data transfer-related signal processing algorithms designed to compensate for the effects of the impairments and noise introduced by the channel, such as echo cancellation, signal equalization, and error correction coding, as well as non-channel related operations such as data compression or voice compression algorithms. The present invention provides for the dynamic allocation to processing unit 204 of processor resources of host processor 201 to data transfer-related operations in order to minimize the processor resources used for data transfer-related operations and to maximize the processor resources available for other applications, such as DTE user applications 108.

In the embodiment, complexity controller 206 monitors and determines a condition of channel 102 and a performance margin as well as the processing load of host processor 201. Preferably, the channel condition of channel 102 and the performance margin provided by MCD 104 are determined based on channel probing; however, those who are of ordinary skill in the art will realize that there are numerous ways by which channel quality may be determined, such as by mean squared error measurements or forward error correction error count, without departing from the scope of the present invention. Complexity controller 206 determines, based on the channel condition, performance margin, and processing load, an optimal complexity setting for MCD 104 to meet a predetermined QoS requirement. Complexity controller 206 determines the processor resources required to support the determined complexity setting and allocates the required processor resources from host processor 201 to processing unit 204. Processing unit 204 of MCD 104 then performs only the data transfer-related operations appropriate for the determined complexity setting. The complexity of MCD 104 can be varied, for example, by varying the number of filter stages of an equalizer or the number of carriers used in a multi-carrier system, or enabling or disabling operations such as compression or error correction.

In the preferred embodiment, the QoS is a fixed requirement such as a minimum data rate and bit error ratio for data transmission or a bandwidth utilization for compression. However, in the alternative, the QoS can be a "best effort" goal rather than a fixed requirement. In the case of a best effort goal, there is more opportunity for the complexity controller 206 to trade off between host processor 201 resource consumption and delivered QoS under a given channel condition.

In the illustrated embodiment, the condition of channel 102 and the QoS target are quantized into an index to a table. The contents of the table are predetermined based on analysis or simulation, and in the table are stored the desired complexity configuration parameters for a given channel condition and QoS target. The relationship between a given channel condition and the complexity parameters selected to operate under the given channel condition is up to the designer of MCD 104, and those who are of ordinary skill in the art can appreciate that there are a variety of ways to configure MCD 104 and adaptively allocate processor resources based on any particular channel condition.

In general, the present invention provides an MCD 104 that is capable of executing multiple data transfer-related operations and is highly configurable. Complexity controller 206 monitors a channel condition and determines the optimal complexity setting in regard to processor resource utilization, preferably the minimum number of executable data transfer-related operations, for MCD 104 to meet a given QoS requirement for the channel condition. Complexity controller 206 allocates, from host processor 201 to processing unit 204, the processor resources required to support the determined complexity setting and MCD 104 performs only the data transfer-related operations appropriate for the determined complexity setting. The monitoring and resource allocation operations performed by MCD 104 are performed dynamically, such that the allocation of processor resources to processing unit 204 of MCD 104 is minimized at all times. The benefit of such an arrangement is that in an environment where MCD 104 shares host processor 201 with other applications (e.g., shares host processor 201 with other MCD's or with non-MCD applications, such as DTE user applications 108), host processor's 201 resource will be optimally utilized.

A method of channel probing is provided in ITU-T Recommendation V.34, involving the use of a probe signal having predetermined, defined characteristics. This method of channel probing can be utilized for MCD's comprising V.34, V.90 or V.92 modems. The probe signal is transmitted from an MCD 104 of a first (sending) network terminal 103 (i.e., a sending MCD) of the multiple network user terminals 101, 103 to an MCD 104 of a second (receiving) network terminal 101 (i.e., a receiving MCD) during an initial communication period (training period) in which the two MCD's train with each other. The receiving MCD analyzes the received probe signal in light of the standard sequence assumed (or known) to have been transmitted, measuring various signal quality metrics such as attenuation distortion (AD) and signal-to-noise ratio (SNR) across the spectrum (band) in order to determine such transmission parameters as the degree of non-linearity of the channel, envelope delay distortion, the optimum symbol rate, the optimum carrier frequency, the carrier frequency offset, the timing frequency offset, the transmit power level, the optimal bit rate, and the degree of transmit pre-emphasis. In order to properly assess the channel conditions and optimal transmission parameters, signal processing techniques such as echo cancellers and equalizers are not operating during the initial, probing portion of the training period.

An alternative method of channel probing is provided in ITU-T Recommendations G.991.1 and G.992.1, involving the use of a probing signal transmitted from the sending network terminal 103 (sending MCD) to the receiving network terminal 101 (receiving MCD) during training period for asymmetric digital subscriber line (ADSL) modems. The probing signal has multiple segments and has predetermined characteristics optimized for the purpose of channel probing. In particular, all sub-carriers or tones of the probing signal are activated. The transmitting MCD utilizes the probing signal to train its echo canceller, and the receiving MCD utilizes the probing signal to establish synchronization and to train its equalizer. The probing signal is also used to determine the signal to noise ratio (SNR) of each sub-carrier. This can be achieved by the receiving MCD via measuring the Mean Squared Error (MSE) of each sub-carrier. The SNR of each sub-carrier is an indication of channel conditions and can be utilized by complexity controller 206 as described below to optimize processor resource utilization by MCD 104.

Although two methods of channel probing are described above, those who are of ordinary skill in the art will realize that there are other methods for determining the condition of a communication channel, and these other methods can also be utilized without departing from the scope of the present invention.

In the preferred embodiment, complexity controller 206 determines a quality metric for channel 102 based on the results of the probe signal testing by MCD 104 as described above. The quality metric is based on any one or more, preferably all, of the signal quality metrics measurements and transmission parameter determinations discussed above. If the quality metric indicates a benign channel, complexity controller 206 might configure MCD 104 to perform less sophisticated data transfer-related operations for a given QoS requirement, thereby freeing up processor resources for other applications sharing the resources of host processor 201.

For example, complexity controller 206 might determine that MCD 104 use an equalizer length and a symbol rate that are the minimum required to meet the QoS requirement for channel 102. As another example, complexity controller 206 might monitor the mean squared error of the full-duplex training signal and determine that MCD 104 use a length of an echo canceller that is the minimum required to meet the QoS requirement of channel 102. If channel 102 is determined to be sufficiently benign for the QoS target, complexity controller 206 also might determine that MCD 104 use a lower complexity trellis coding or even operate with trellis coding disabled.

By way of another example, an MCD 104 might be a Discrete Multi-Tone (DMT)-based modem (e.g., an ADSL modem). In the event that a measurement of a condition of channel 102 indicates a high quality channel that has a large SNR margin supporting the target data rate, a bit loading operation might be adaptively tuned to pack the bits into a smaller set of tones. By packing the bits into a smaller set of tones, some data transfer-related operations executed with respect to unused tones may be omitted, such as a frequency domain equalizer, a slicer or Viterbi decoder, and a demapper. Omission of these data transfer-related operations frees up processor resources for other purposes.

By way of yet another example, an MCD 104 might be a voice-band modem. After completion of the probe signal test and based on a determined quality metric, MCD 104 can determine the minimum length and structure of an adaptive equalizer and echo canceller required to attain a maximum data rate on the channel and make the appropriate adjustments. Or, in the alternative, in the event that the quality metric indicates a poor quality channel, processor resources may be freed up by optimizing the parameters of the adaptive filters for a lower data rate.

In general, complexity controller 206 determines a quality metric for the communication channel 102, preferably by use of a probe signal, determines a required complexity level of MCD 104 based on the quality metric, and allocates the processor resources required to support the determined complexity level. For example, if channel conditions are benign, complexity controller 206 can disable or adjust the complexity of data transfer-related operations such as trellis coders, adaptive equalizers, echo cancellers, slicers, or decoders. Complexity controller 206 allocates only the host processor 201 resources necessary to support the remaining data transfer-related operations. By dynamically adjusting the complexity of MCD 104, processor resources are freed up for use by non-data transfer-related applications.

In an alternate embodiment of the present invention, host processor 201 sub-divides a data transfer-related operation comprising multiple tasks or multiple operations into each of the application's component tasks or operations. Instead of initially setting aside enough processor resources to run all tasks or operations appropriate for a worst case channel condition, the host processor initially assumes benign communication channel conditions and allocates to processing unit 204 only enough processor resources to perform a minimum amount of data transfer-related operations, preferably the tasks or operations deemed to be most critical. Additional processor resources are then allocated to perform the less critical tasks or operations when needed.

For example, if MCD 104 uses Forward Error Correction (FEC) coding, such as Reed-Solomon coding, the decoding operation executes two algorithms, a syndrome calculation and an error correction. The syndrome calculation is of low complexity but needs to be performed with respect to every block of data. The error correction is of high complexity but only needs to be performed with respect to blocks containing errors as indicated by non-zero syndrome. For error-containing blocks, the complexity of error correction varies, and blocks with fewer erroneous symbols require less processing. Typically, most blocks have few or no errors, so the decoder complexity on average is much less than the worst case. Therefore, host processor 201 initially allocates only enough processor resources to perform the average decoding operation. However, when an unusually long burst of errors occurs and insufficient processor resources are available to perform the error correction, complexity controller 206 can allocate additional processor resources from host processor 201. Preferably, additional MIPS can be made available by temporarily slowing down non-time critical applications running on host processor 201. In the rare case where no MIPS are available, complexity controller 206 instructs MCD 104 to forgo the execution of some data transfer-related operations at the cost of temporarily degraded QoS. In the FEC example, the skipping of error correction on some blocks will result in a temporarily higher bit error ratio. However, the first alternative embodiment allows host processor 201 to accommodate MCD 104 data transfer-related operations with highly uncertain processor resource requirements, such as FEC, that are otherwise unfeasible with fixed processor resource allocations.

In a another alternative embodiment of the present invention, the processor resources allocated for MCD 104 are adaptively allocated to meet variable QoS requirements. Complexity controller 206 reacts to a change in a QoS requirement input by adjusting the complexity of MCD 104. Or in the case of a best effort QoS goal, complexity controller 206 may react to a processor resource change of host processor 201 and adjust the complexity of MCD 104 to deliver an optimal QoS. For example, signal processing by modems typically includes data compression. However, when a network user terminal 101, 103 downloads files from a remote web-based server on the Internet, some large files are in a compressed format before being conveyed to the modem of the remote web-based server for transmission over the Internet. An MCD 104 of the network user terminal 101, 103 can determine that a file has already been compressed by such means as analyzing the filename extension (e.g., "zip" files) or by notification of the file type by the remote web-based server. Complexity controller 206 may regard the requirement of whether compression is needed as a QoS requirement input. In the event of a determination or notification of an already compressed file, MCD 104 requests the transmitting modem to disable the transmitting modem's data compression algorithm and to enter a transparent mode. MCD 104 can then, in turn, disable its own data decompression algorithm, thereby freeing up processor resources for other applications.

In another alternative embodiment of the present invention, MCD 104 is required to achieve a best effort data rate at given bit error ratio. When host processor 201 is so heavily loaded that host processor 201 lacks sufficient processor resources to perform MCD 104 data transfer-related operations necessary to maintain the current level of QoS performance, complexity controller 206 gradually reduces the complexity of MCD 104 until the demand on the host processor's 201 resources are brought within the limits of the resources available. For example, MCD 104 data transfer-related operations are ranked according to their importance (i.e., their effect on QoS). Complexity controller 206 then disables or reduces the data transfer-related operations in inverse order to their level of importance. For example, in an ADSL modem, the execution of an error correction operation of Reed-Solomon decoding can be disabled first. If disabling the error correction operation can not bring a MIPS requirement of MCD 104 down to within the limit of available MIPS, then the Reed-Solomon decoding can be disabled altogether. The MIPS requirement may be further reduced by a reduction in a rate at which the equalizer is adapted, and so on. Such complexity reduction measures may result in degradation of QoS. However, most modem standards allow for dynamic QoS renegotiations, such as rate re-negotiation in V.34 and V.90 modems and fast retrain in G.992.1 ADSL modems, that can be utilized to lower the QoS. In the above example, the data rate can be lowered to maintain the same bit error ratio. This provides a graceful QoS degradation path for an MCD 104 that shares processor resources with other applications and significantly improves the robustness of the MCD 104.

In another alternative embodiment of the present invention, the disabling and reduction of data transfer-related operations can also be run in reverse. That is, data transfer-related operations can be enabled or added to achieve a higher QoS by the allocation of more processor resources to MCD 104 when complexity controller 206 determines that host processor 201 is underloaded.

In general, besides adjusting the complexity of MCD 104 based on channel conditions, complexity controller 206 can also dynamically adjust the complexity of MCD 104 to reduce the load on host processor 201 in high load conditions or to eliminate wasteful operations, such as decompressing a compressed file that need not be compressed to begin with. To reduce the processor load in high load conditions, the data transfer-related operations can be subdivided into component operations and then only select component operations are performed. Alternatively, the data transfer-related operations might be ranked according to their level of importance and then gradually disabled in inverse order to level of importance until the demand for the host processor's resources is reduced to an acceptable level.

Figure 4:
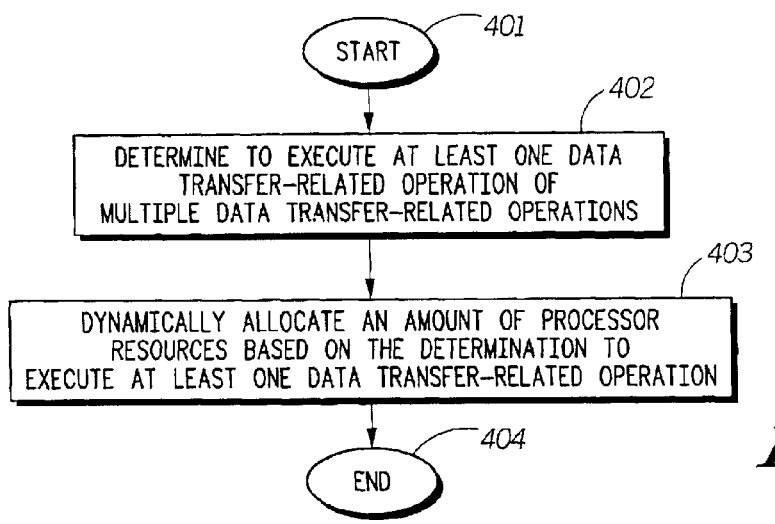
FIG. 4 is a logic flow diagram of steps executed by a communication device to dynamically allocate processor resources in accordance with an embodiment of the present invention.

FIG. 4 illustrates a logic flow diagram 400 of the steps executed by a communication device, wherein the communication device includes multiple data transfer-related operations, for dynamically allocating processor resources in accordance with an embodiment of the present invention. The communication device, preferably a multimedia communication device (MCD) such as a modem, is implemented in the processor as described above in FIG. 2. Alternatively, the communication device might be a conventional modem that includes the processor. The logic flow begins (step 401) when the communication device determines (step 402) to execute at least one of the multiple data transfer-related operations, such as echo cancellation, error correction, and signal equalization.

In the preferred embodiment, the step of determining (402) to execute at least one of the multiple data transfer-related operations comprises the steps of the MCD determining a condition of a communication channel, determining a channel quality metric, such as a signal quality metric or a transmission parameter, based on the determined channel condition, and determining to execute at least one of the multiple data transfer-related operations based on the determined channel quality metric. Preferably, the MCD determines the channel condition based on probe signal testing; however, those who are of ordinary skill in the art will realize that there are numerous ways by which channel quality may be determined, such as by mean squared error measurements or forward error correction error count, without departing from the spirit and scope of the present invention.

In an alternative embodiment of the present invention, the step of determining (402) to execute at least one of the multiple data transfer-related operations includes the steps of determining an amount of available processor resources and determining to execute at least one of the multiple data transfer-related operations based on the determined processor resource availability. When the available processor resources are particularly low, that is, when the execution of all data transfer-related operations would create a processor load that exceeds available processor resources, the MCD determines to execute at least one, but less than all, of the data transfer-related operations. For example, the data transfer-related operations can be ranked according to their importance. The method then further includes the step of disabling the data transfer-related operations in inverse order to their level of importance in response to the determination to execute at least one, but less than all, of the multiple data transfer-related operations.

In another alternative embodiment, the communication device sub-divides a data transfer-related operation that includes multiple operations into each of the operation's component operations, wherein each component operation also constitutes a data transfer-related operation. When the available processor resources are particularly low, the step of determining (402) to execute at least one, but less than all, data transfer-related operations includes the step of determining to execute at least one but less than all of the component operations. In yet another alternative embodiment, the step of determining (402) includes the step of determining to partially disable at least one of the data transfer-related operations. For example, in an ADSL modem, the execution of an error correction operation of Reed-Solomon decoding can be disabled first, followed by the disabling of the Reed-Solomon decoding altogether, followed by a reduction in the rate at which an equalizer is adapted, and so on.

In the preferred embodiment, the MCD, preferably the complexity controller, dynamically allocates (403) the processor resources based on the determination to execute at least one of the multiple data transfer-related operations, and the logic flow ends (404). In an alternative embodiment of the present invention, the method further includes the step of executing, by the MCD, the at least one of the multiple data transfer-related operations.

As described above, the present invention provides a method for dynamically allocating processor resources of an MCD so that the resources required for the execution of data transfer-related operations are minimized and the resources available for non-data transfer-related applications are maximized. The MCD determines the condition of a communication channel or the resource load of a processor, and determines to execute at least one data transfer-related operation based on the determined channel condition or resource load. For example, when the channel conditions are benign or the demand for processor resources exceeds the resources available, the MCD would disable or reduce the complexity of selected data transfer-related operations. The MCD then allocates only the processor resources required to support the remaining data transfer-related operations.

Figure 5:
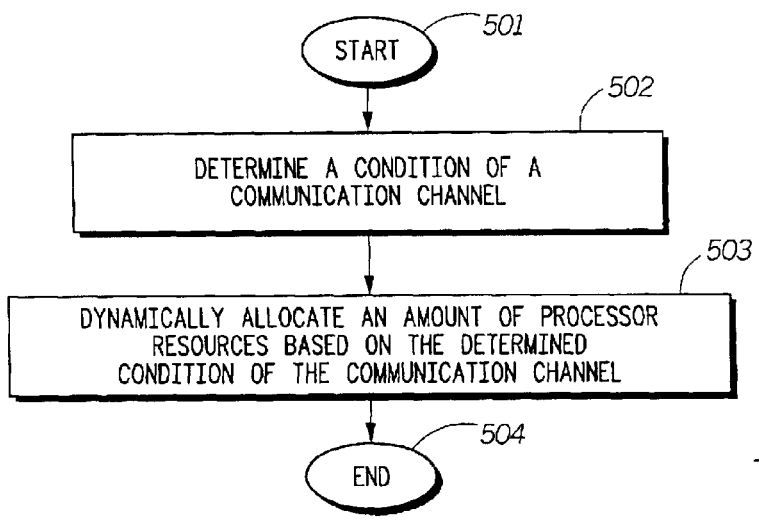
FIG. 5 is a logic flow diagram of steps executed by a communication device to dynamically allocate processor resources in accordance with another embodiment of the present invention.

FIG. 5 illustrates a logic flow diagram 500 of the steps executed by a communication device, wherein the communication device includes multiple data transfer-related operations, for dynamically allocating processor resources in accordance with an embodiment of the present invention. Preferably, the communication device, preferably a multimedia communication device (MCD) such as a modem, is implemented in the processor as described above in FIG. 2. The logic flow begins (step 501) when the communication device determines (step 502) a condition of a communication channel. The communication device dynamically allocates (step 503) the processor resources based on the determined condition of the communication channel, and the logic flow ends (step 504).

In the embodiment as described in FIG. 5, the method further includes the steps of determining, by the communication device, a channel quality metric based on the determined channel condition and determining, by the communication device, to execute at least one data transfer-related operation of the plurality of data transfer-related operations based on the determined condition of the communication channel. Furthermore, the step of allocating (503) processor resources preferably includes the step of allocating processor resources based on the determined channel quality metric, or alternatively based on the determined channel quality metric and on the determination to execute at least one data transfer-related operation.

Generally, the present invention provides a method and apparatus for reducing the complexity of a communication device for a benign channel and/or for a certain quality of service (QoS) target, freeing up processor resources for the execution of other tasks. Compared to the prior art approach where the complexity of the communication device is always at maximum for the capability of the processor, the present invention provides a communication device that is capable of executing multiple data transfer-related operations and is highly configurable. A complexity controller monitors a channel condition and determines the optimal complexity setting in regard to processor resource utilization, preferably the minimum number of executable data transfer-related operations, for the communication device to meet a given QoS requirement for the channel condition. Alternatively, a processor monitors the demand for resources and adjusts the complexity setting based on the processor support required for non-data transfer-related operations. The result is a dynamically adjusted complexity that does not waste processor resources on data transfer-related operations not warranted by channel conditions, or which frees up processor resources when required for non-data transfer-related applications.

While the present invention has been particularly shown and described with reference to particular embodiments thereof, it will be understood by those skilled in the art that various changes in form and details may be made therein without departing from the scope of the present invention.

What is claimed is:

1. An apparatus for the dynamic allocation of processing resources of a host processor by a communication device, wherein the communication device comprises a plurality of data transfer-related operations and at least one non-data transfer operation, and wherein the apparatus comprises a host processor that comprises:

a complexity controller that controls the allocation of the amount of processing resources between the plurality of data transfer-related operations and the at least one non-data transfer operation by determining to execute at least one data transfer-related operation of the plurality of data transfer-related operations; and a processing unit, coupled to the complexity controller, that executes the at least one data transfer-related operation of the plurality of data transfer-related operation based on the determination to execute at least one data transfer-related operation.

2. The apparatus of claim 1, wherein the apparatus further comprises an interface apparatus coupled to the processing unit.

3. The apparatus of claim 1, wherein the complexity controller further determines a condition of a communication channel.

4. The apparatus of claim 3, wherein the complexity controller further determines a quality metric based on the determined condition of the communication channel, and wherein the determination to execute at least one data transfer-related operation is based on the quality metric.

5. The apparatus of claim 4, wherein the apparatus further comprises a quality of service requirement and wherein the determination to execute at least one data transfer-related operation is based on the quality of service requirement and the determined quality metric.

6. The apparatus of claim 1, wherein the complexity controller further determines an available processor resource and wherein the determination to execute at least one data transfer-related operation is based on the determined available processor resources.

7. A method for dynamically allocating an amount of processing resources of a host processor by a communication device, wherein the communication device comprises a plurality of data transfer-related operations and at least one non-data transfer operation, and wherein the method comprises the steps of:

determining to execute at least one data transfer-related operation of the plurality of data transfer-related operations; and allocating the amount of processing resources between the plurality of data transfer-related operations and the at least one non-data transfer operation based on the determination to execute the at least one data transfer-related operation of the plurality of data transfer-related operations.

8. The method of claim 7, wherein in the step of determining, a condition of a communication channel is determined.

9. The method of claim 8, further comprising the step of determining a quality metric based on the determined condition of the operating channel, and wherein the step of determining to execute at least one data transfer-related operation is based on the determined quality metric.

10. The method of claim 9, further comprising the step of determining a quality of service requirement and wherein the determination to execute at least one data transfer-related operation is based on the quality of service requirement and the determined quality metric.

11. The method of claim 7, further comprising the step of determining a resource load of the processor, and wherein the determination to execute at least one data transfer-related operation is based on the determined resource load of the processor.

12. The method of claim 7, further comprising the step of executing at least one data transfer-related operation in response to the determination to execute at least one data transfer-related operation.

13. A method for dynamically allocating an amount of processing resources of a host processor by a communication device, wherein the communication device comprises a plurality of data transfer-related operations and at least one non-data transfer operation, and wherein the method comprises the steps of:

determining a condition of a communication channel; and allocating the amount of processing resources between the plurality of data transfer-related operations and the at least one non-data transfer operation based on the determined condition of the communication channel.

14. The method of claim 13, further comprising the step of determining a quality metric based on the determined condition of the communication channel.

15. The method of claim 13, further comprising the step of determining to execute at least one data transfer-related operation of the plurality of data transfer-related operations based on the determined condition of the communication channel.

16. The method of claim 15, wherein the step of allocating the amount of processing resources comprises the step of allocating the amount of processing resources based on the determined condition of the communication channel and on the determination to execute at least one data transfer-related operation.

* * * * *